Feb. 14, 1933. M. A. BIRK 1,897,747

DEVICE FOR SIMULATING NATURAL EYELASHES

Filed Aug. 15, 1932

Patented Feb. 14, 1933

1,897,747

UNITED STATES PATENT OFFICE

MARJORIE A. BIRK, OF NEW YORK, N. Y.

DEVICE FOR SIMULATING NATURAL EYELASHES

Application filed August 15, 1932. Serial No. 628,887.

My invention relates to artificial eyelashes and refers particularly to devices simulating natural eyelashes.

The attractiveness of long eyelashes is generally acknowledged and attempts have been made to simulate them by supplying artificial eyelashes which are capable of attachment to the upper eyelid or to the natural eyelashes.

All of the previously known devices for this purpose have had serious objections to their method of application or to their appearance when applied and, hence, have failed of general employment.

Those devices consisting of a plurality of hairs or artificial eyelashes, attached to a strip of fabric to be cemented, or glued, to the upper eyelid are objectionable because their use is apparent, no matter how thin and transparent the fabric may be and, hence, while they have been adopted for stage and screen purposes, they are not wholly acceptable for social use.

The method of attaching a single artificial eyelash to each individual natural eyelash overcomes the above mentioned objection, but possesses the disadvantages incident to the process of application, which is inconvenient, difficult and slow in operation.

My invention overcomes all of the above mentioned, and other, objectionable features incident to previously known devices for the described purpose and presents a device which can be readily and quickly applied to each eye as a unit and which is practically undiscernible as being artificial.

My device, therefore, is of the greatest value in the art of beautification by means of artificial eyelashes capable of being adopted for social use, without the disfiguration incident to fabric devices and without the difficulty of application incident to the attachment of individual artificial eyelashes.

In the accompanying drawing, illustrating one form of the device of my invention, similar parts are designated by similar numerals.

Figure 1:
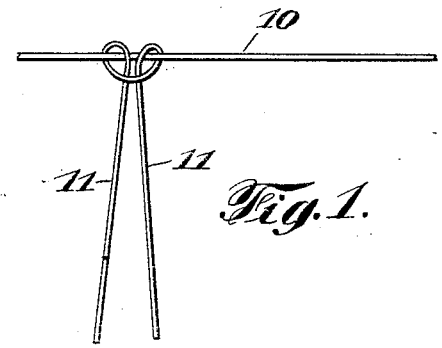
Figure 1 illustrates a method for attaching an artificial eyelash to the base filament, the eyelash loop being loose.
Figure 2:
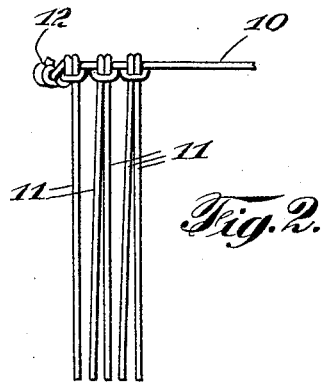
Figure 2 illustrates a plurality of artificial eyelashes attached to a base filament.
Figure 3:
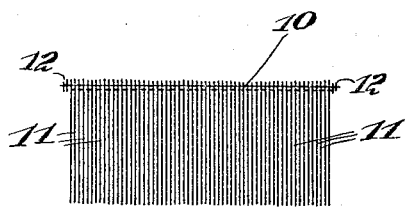
Figure 3 illustrates the finished device.
Figure 4:
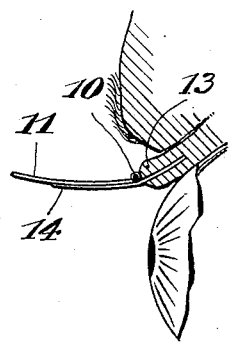
Figure 4 is a vertical section of an eyelid with my device attached thereto.

The particular form of the device of my invention illustrated in the accompanying drawing comprises a base filament 10, to which are attached a plurality of eyelash filaments 11, 11, preferably knotted to the base filament 10 in the manner indicated.

In order to prevent filaments 11, 11, from slipping over the ends of the base filament 10, I prefer to knot the end filament 11 with the end of the filament 10, as shown at 12, but other suitable means may be employed.

The filaments 10 and 11 may be of hair; or vegetable or animal fibers, as cotton, linen or silk, and the base filament 10 may consist of a plurality of fibers in order to give it greater strength and stability than would be incident to a single filament, and in referring to "filament" in my specification and claims, I include both a single filament and a plurality of filaments.

The filaments may be treated with a stiffening agent, as shellac, if desired, and as the device is to be attached by means of a cementitious material, it may be previously treated with a cementitious material and dried and then moistened when the device is applied, or the cementitious material may be used at the time of the application of the device.

The application of my device is as follows:—The filaments 11, 11, and the base filament 11 are treated with a cementitious material, or moistened if they already carry a cementitious material, and the device is then applied in such a manner that the base filament 10 is attached to the outer portion of the eyelid 13 and the filaments 11, 11, rest upon and are attached, at least in part, to the natural eyelashes 14, 14.

Figure 5:
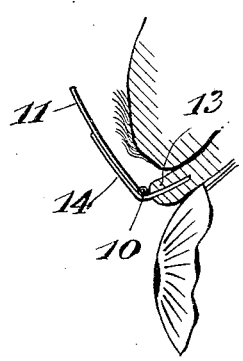
Figure 5 is similar to Figure 4 with the natural and artificial eyelashes similarly curled or curved.

The filaments 11, 11 and the natural eyelashes 14, 14, may be curled, or curved, simultaneously, if desired, to produce the result shown in Fig. 5.

It will thus be seen that my device is practically undiscernible, because of the thinness of the base filament 10 and its direct attachment to the outer end portion of the eyelid and further because of the attachment of the eyelish filaments 11, 11, to the natural eyelashes 14, 14, thus giving them a unity of appearance and allowing them to be curled, or curved, uniformly.

My device can be readily and quickly attached as a unit to each eyelid and can be easily removed, if desired, by moistening the cementitious material.

My device, therefore, presents a great and valuable advance in the art of artificial eyelashes because of its cheapness, simplicity, ease of attachment and detachment, of its advantageous and attractive results and its inconspicuousness.

I do not limit myself to the particular size, shape, number, arrangement of parts or character of materials specifically shown and described, as these are given simply as a means for clearly describing the device of my invention.

What I claim is:—

1. A device adapted to simulate natural eyelashes, comprising a base filament and a plurality of eyelash filaments attached thereto, and extending outwardly therefrom in a comparatively common plane.

2. A device adapted to simulate natural eyelashes, comprising a base hair filament and a plurality of eyelash filaments attached thereto, and extending outwardly therefrom in a comparatively common plane.

3. A device adapted to simulate natural eyelashes, comprising a base filament and a plurality of eyelash hair filaments attached thereto, and extending outwardly therefrom in a comparatively common plane.

4. A device adapted to simulate natural eyelashes, comprising a base hair filament and a plurality of eyelash hair filaments attached thereto, and extending outwardly therefrom in a comparatively common plane.

5. A device adapted to simulate natural eyelashes, comprising a base filament, a plurality of eyelash filaments attached thereto, and extending outwardly therefrom in a comparatively common plane and a stiffening material carried by said filaments.

6. A device adapted to simulate natural eyelashes, comprising a base filament, a plurality of eyelash filaments attached thereto, and extending outwardly therefrom in a comparatively common plane and a cementitious material carried by said filaments.

7. A device adapted to simulate natural eyelashes, comprising a base filament, a plurality of eyelash filaments attached thereto, and extending outwardly therefrom in a comparatively common plane, a stiffening material carried by said filaments and a cementitious material carried by said filaments.

8. A device adapted to simulate natural eyelashes, comprising a base hair filament, a plurality of eyelash filaments attached thereto, and extending outwardly therefrom in a comparatively common plane, a stiffening material carried by said filaments and a cementitious material carried by said filaments.

Signed at New York city in the county of New York and State of New York this 12th day of August, 1932.

MARJORIE A. BIRK.